United States Patent [19]
Dorma

[11] Patent Number: 5,475,927
[45] Date of Patent: * Dec. 19, 1995

[54] CUTTING TOOL

[76] Inventor: Edward Dorma, 902 Windsor Dr., Sarasota, Fla. 34234

[*] Notice: The portion of the term of this patent subsequent to Nov. 9, 2010, has been disclaimed.

[21] Appl. No.: 147,937

[22] Filed: Nov. 5, 1993

Related U.S. Application Data

[63] Continuation-in-part of Ser. No. 44,151, Apr. 8, 1993, Pat. No. 5,259,117.

[51] Int. Cl.$^6$ .................................................. B26B 17/00
[52] U.S. Cl. ................................................ 30/258; 30/249
[58] Field of Search ........................... 30/134, 155, 177, 30/188, 190, 191, 249, 254, 258

[56] References Cited

U.S. PATENT DOCUMENTS

| | | |
|---|---|---|
| 58,659 | 10/1866 | McCrea . |
| 113,670 | 4/1871 | Howell . |
| 127,735 | 6/1872 | Broadbooks . |
| 205,103 | 6/1878 | Knowles . |
| D. 321,634 | 11/1991 | Inoue . |
| D. 347,562 | 6/1994 | Kim . |
| 785,225 | 3/1905 | Manly . |
| 1,640,168 | 8/1927 | Williams . |
| 1,689,648 | 10/1928 | Voleske . |
| 1,915,404 | 6/1933 | Clifton . |
| 2,975,518 | 3/1961 | Nelson . |
| 4,434,555 | 3/1984 | Stoll . |
| 4,696,107 | 9/1987 | Held ......................................... 30/249 |
| 4,739,745 | 4/1988 | Browning . |
| 5,245,755 | 9/1993 | Krivec ....................................... 30/190 |

FOREIGN PATENT DOCUMENTS 987264  8/1951  France ....................................... 83/607

Primary Examiner—Richard K. Seidel
Assistant Examiner—Allan M. Schrock
Attorney, Agent, or Firm—Burd, Bartz & Gutenkauf

[57] ABSTRACT

A hand tool having a pair of pivotally connected blades connected to a cutting blade having an arcuate outer edge with teeth thereon and an anvil so that on movement of the handles toward each other, the blade rotates toward the anvil and the anvil moves toward the blade to cut an object located between the blade and anvil.

27 Claims, 15 Drawing Sheets

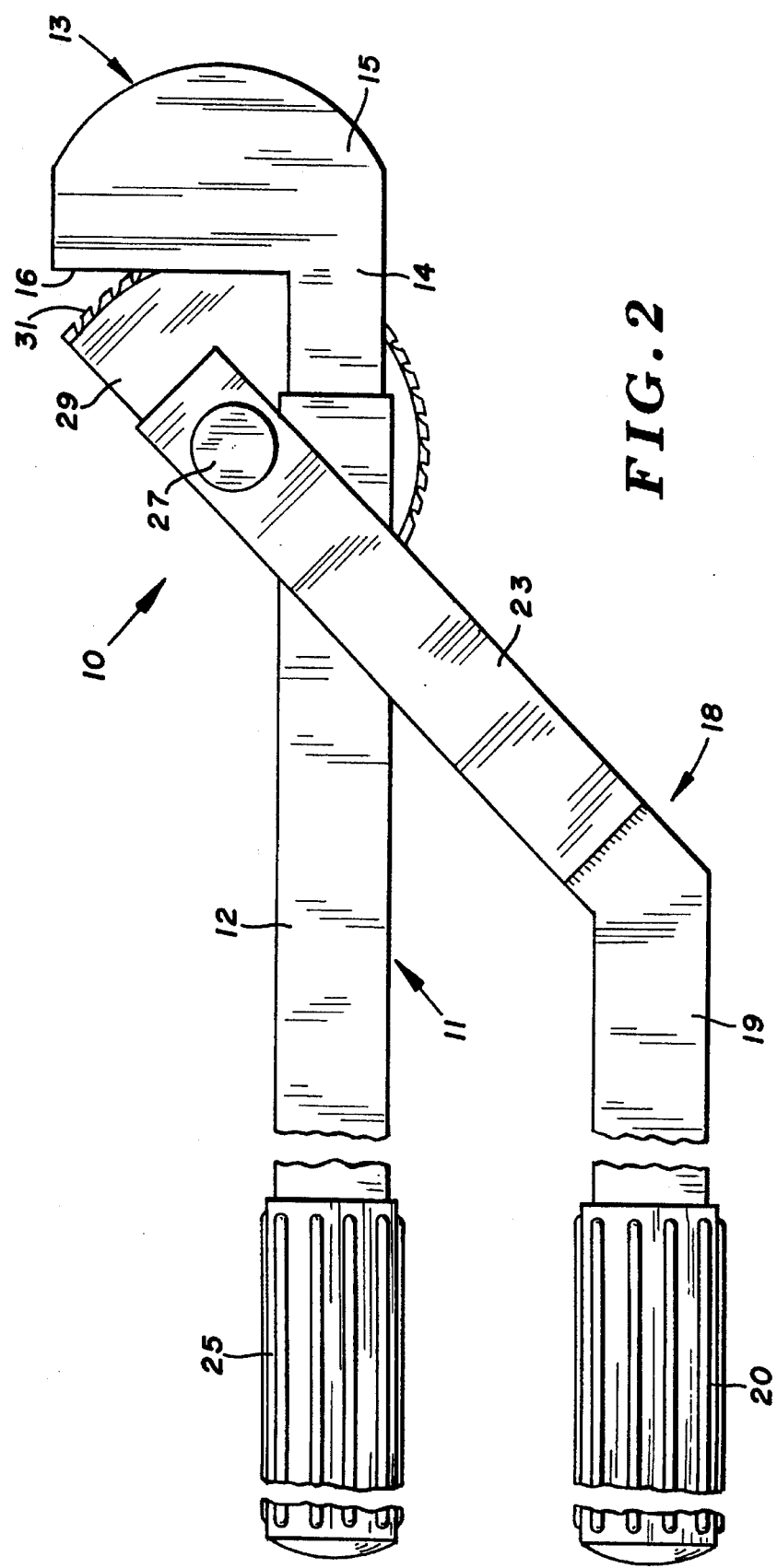

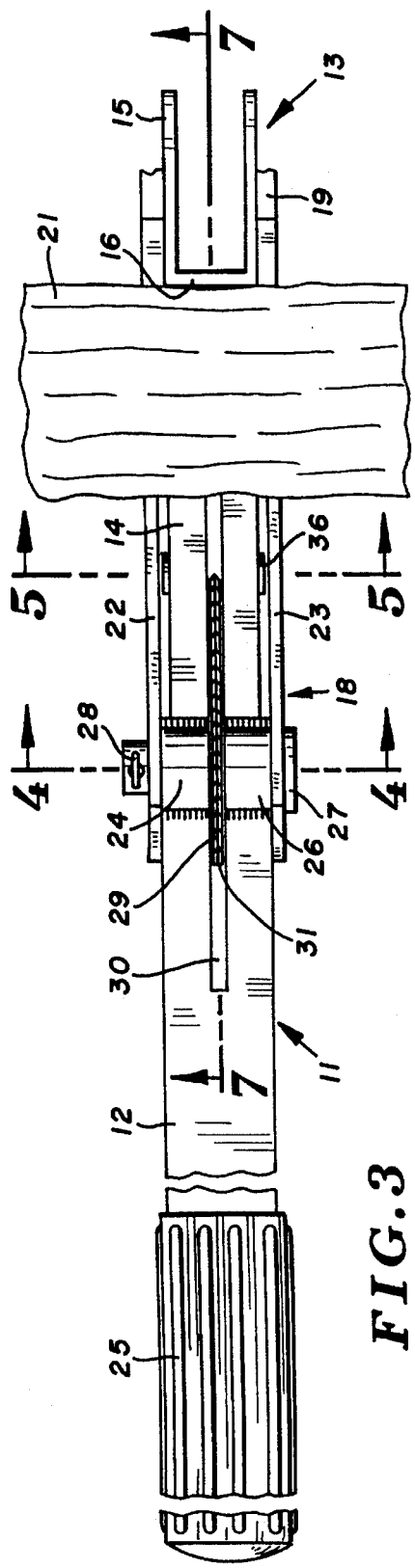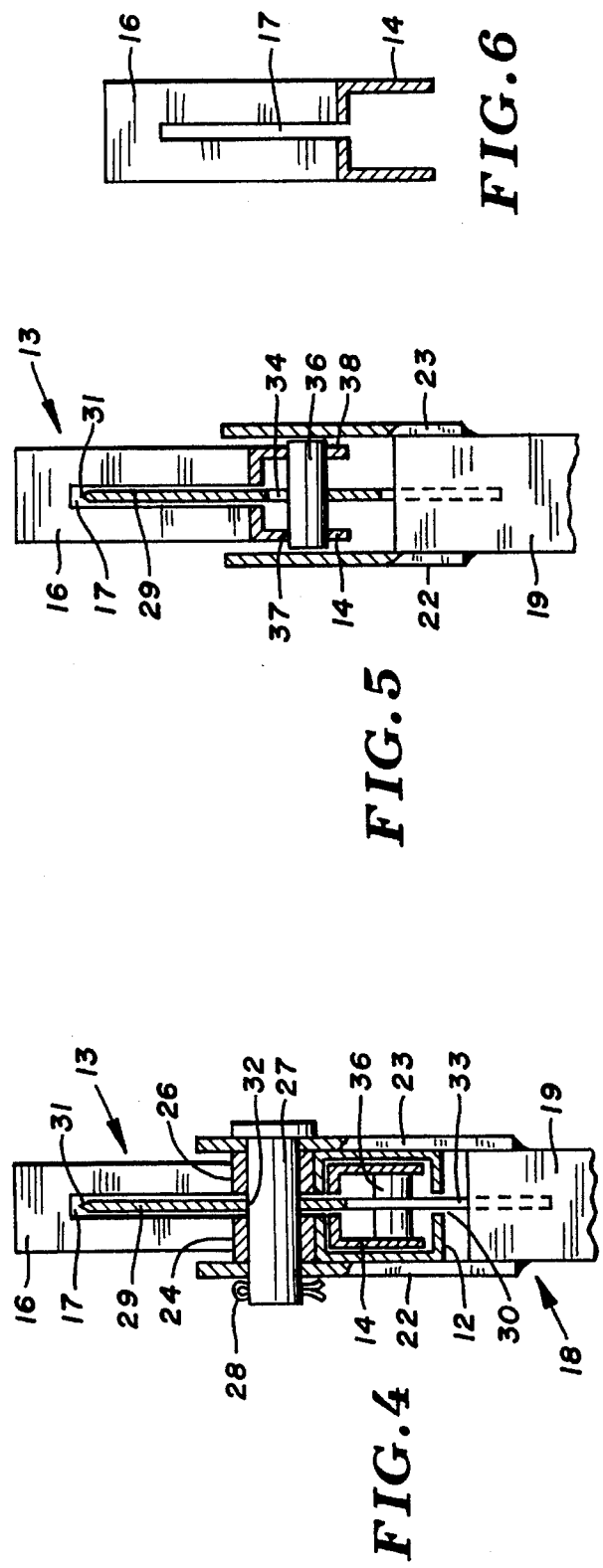

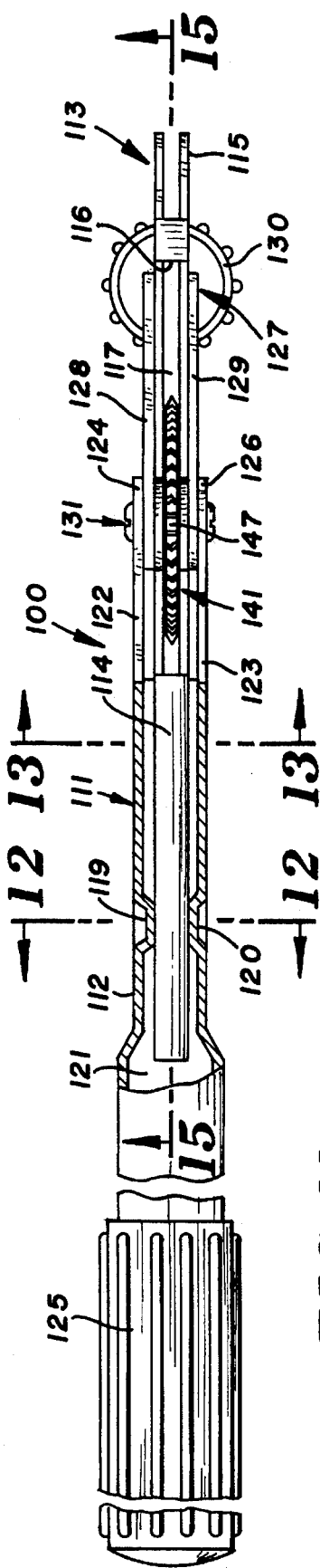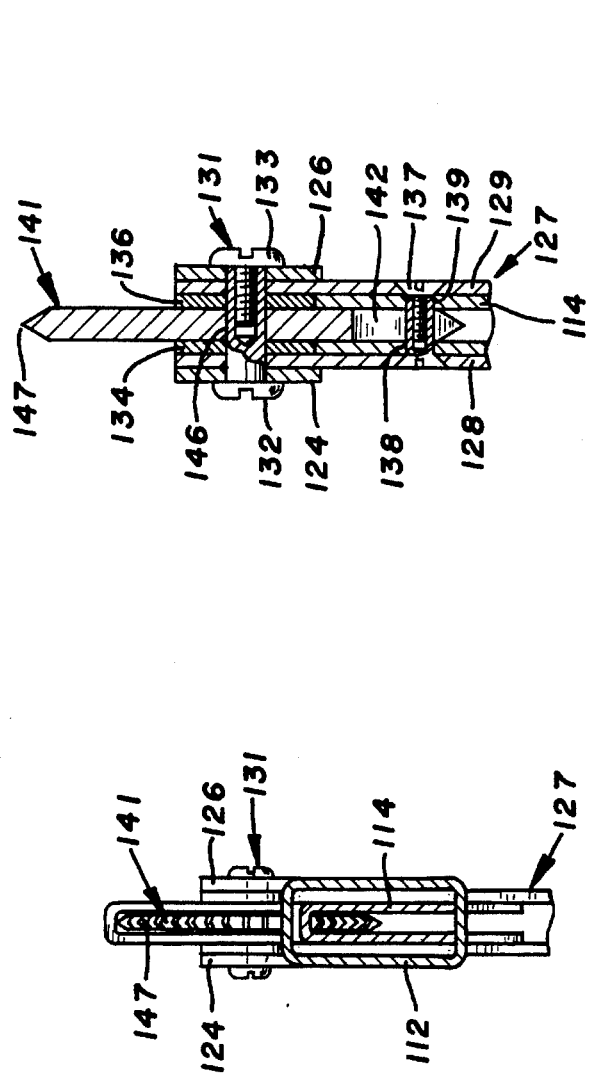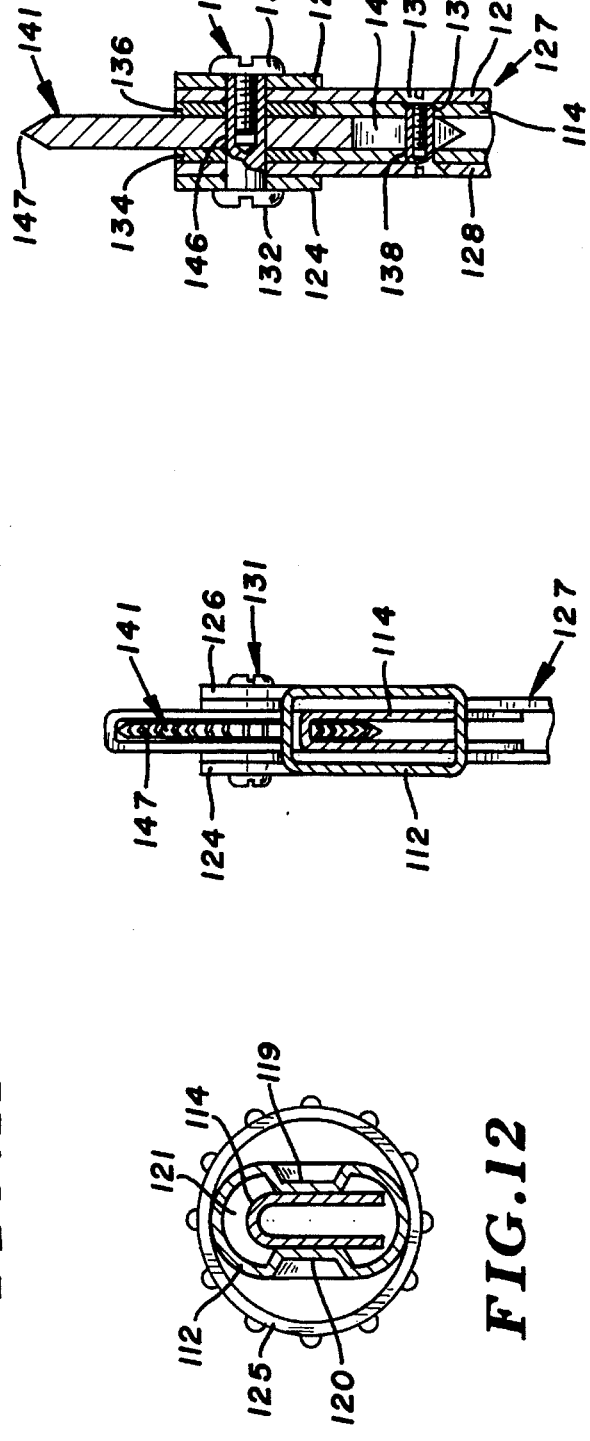
FIG. 11
FIG. 12
FIG. 13
FIG. 14

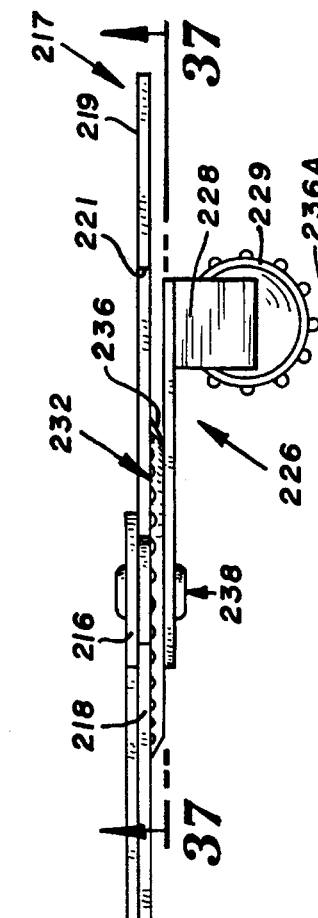
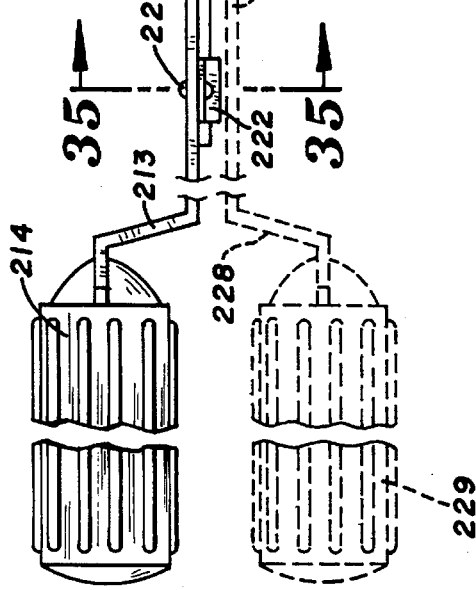
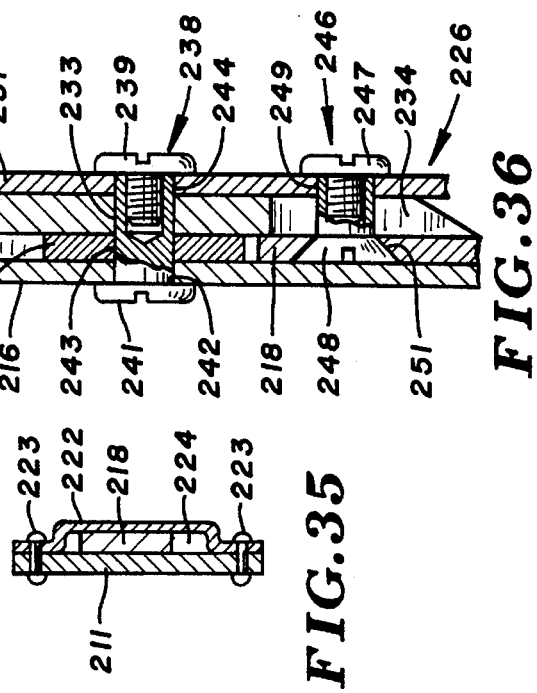
FIG.35
FIG.36
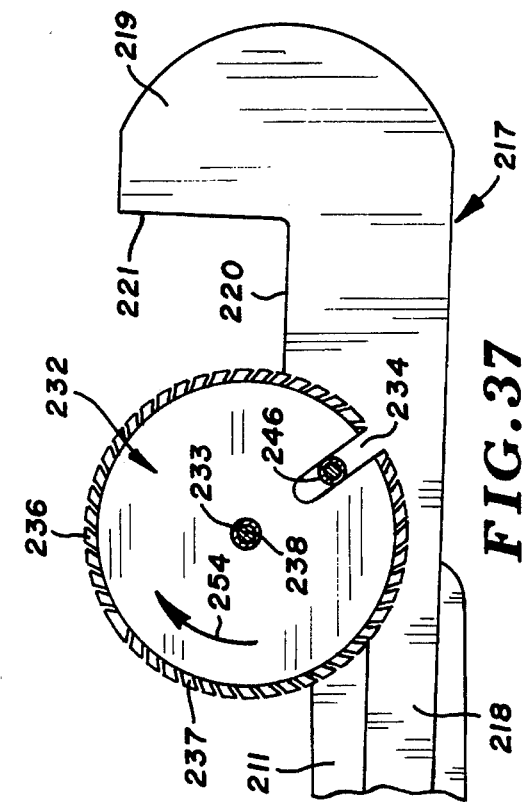
FIG.37

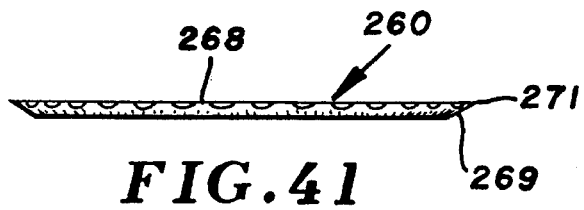
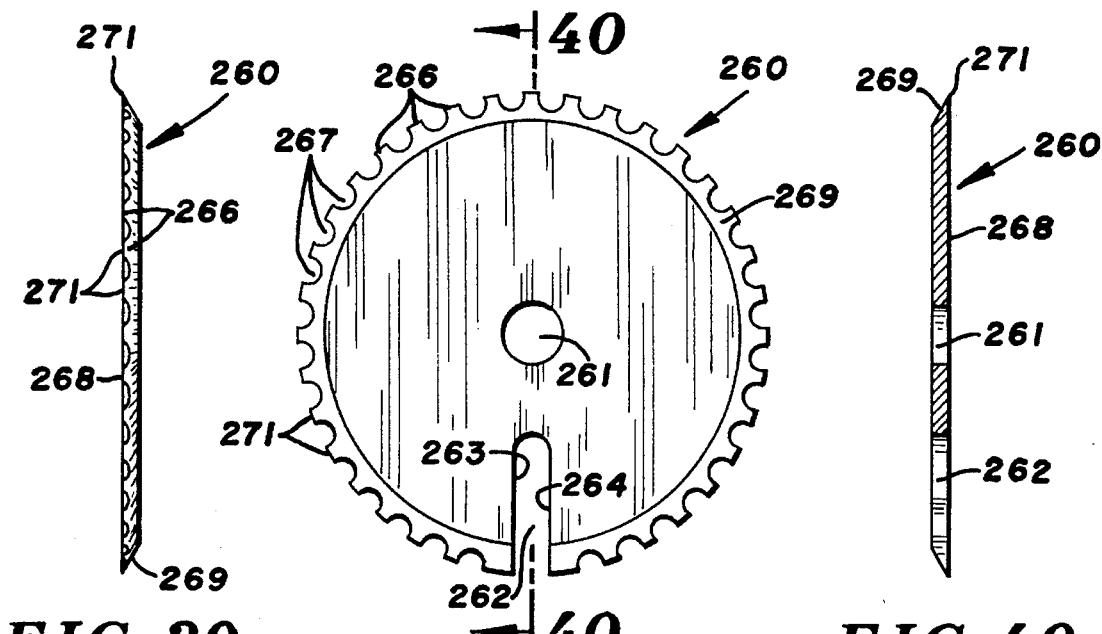
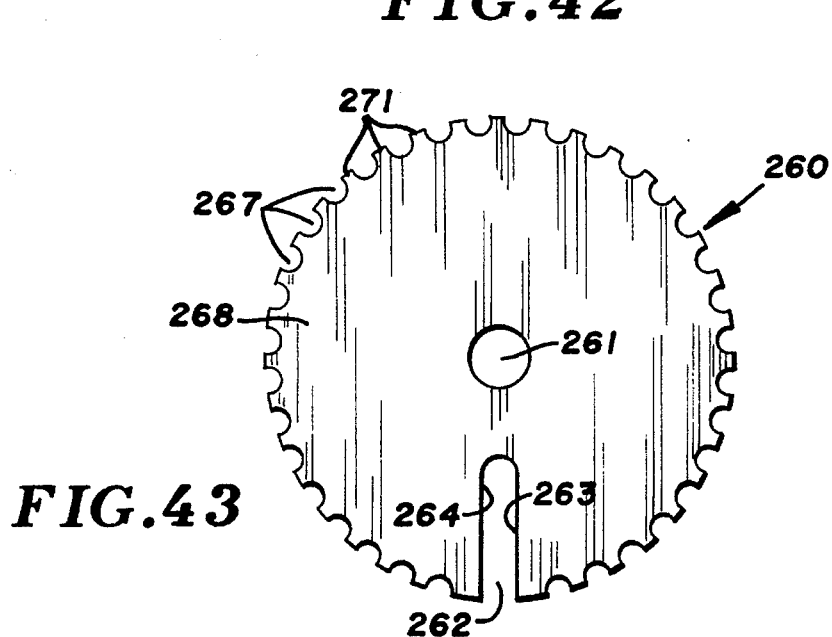

CUTTING TOOL

This is a continuation-in-part of U.S. application Ser. No. 08/044,151 filed Apr. 8, 1993, now U.S. Pat. No. 5,259,117.

FIELD OF THE INVENTION

The invention relates to hand tools for cutting objects, such as wood and the like. The hand tool has pivotally moveable handles that rotate a cutting blade and move an anvil toward the cutting blade to cut an object that is located between the cutting blade and the anvil.

BACKGROUND OF THE INVENTION

Hand operated cutting tools and shears have elongated lever handles that are pivotally connected to move a blade, having a knife edge, toward a jaw to cut wood branches and the like. A pivot bolt connects the arms together so that upon movement of the handles toward each other, a cutting action is achieved by relative movement of the knife and jaw. In some cutting tools, the jaws have concave shapes to cradle the branches in the jaws. The knives have convex shapes, which move toward the convex jaws to cut the objects cradled in the jaws. Considerable force must be applied to the handles of these tools to cut thick and tough wood and branches.

SUMMARY OF THE INVENTION

The invention is an improved hand cutting tool for cutting objects, such as tree branches, wood, plastic, metal and the like. The cutting tool has pivotally connected members operable to rotate a cutting saw blade and move an anvil toward the rotating cutting saw blade to affect cutting of an object located between the cutting blade and the anvil. The object to be cut is forced into the rotating cutting saw blade as the cutting saw blade rotates and saws its way through the object.

The cutting tool has a first handle that accommodates an anvil. The anvil has a body or base that is slideably located within a passage in the outer end of the handle. A second handle is pivotally mounted on the first handle with a pivot pin. A cutting saw blade having a circular outer edge and saw teeth is rotatably mounted on the pivot pin. A drive pin connected to the base and second handle extends through a slot in the saw blade whereby movement of the first and second handles relative to each other rotates the cutting saw blade about the axis of the pivot pin and the anvil is moved toward the cutting saw blade. This forces the object toward the cutting saw blade during the rotation of the cutting saw blade. The sawing action of the cutting saw blade combined with the movement of the object to be cut into the cutting saw blade enables the user to cut relatively large and tough objects with a moderate amount of force applied to the handles. The saw blade can be turned 180° or removed and replaced with a new saw blade having sharp cutting teeth.

DESCRIPTION OF THE DRAWINGS

FIG. 2 is a side elevational view of the cutting saw blade showing the cutting saw blade in the closed position;

FIG. 3 is a foreshortened top plan view of the cutting tool;

FIG. 4 is an enlarged sectional view taken along the line 4—4 of FIG. 3;

FIG. 5 is an enlarged sectional view taken along the line 5—5 of FIG. 3;

FIG. 6 is an enlarged sectional view taken along the line 6—6 of FIG. 1;

FIG. 11 is a foreshortened top plan view, partly sectioned, of the cutting tool of FIG. 9;

FIG. 12 is an enlarged sectional view taken along the line 12—12 of FIG. 11;

FIG. 13 is an enlarged sectional view taken along the line 13—13 of FIG. 11;

FIG. 14 is an enlarged sectional view taken along the line 14—14 of FIG. 9;

FIG. 34 is a foreshortened top elevational view of the cutting tool of FIG. 32;

FIG. 35 is an enlarged sectional view taken along the line 35—35 of FIG. 34;

FIG. 36 is an enlarged sectional view taken along the line 36—36 of FIG. 32;

FIG. 37 is a sectional view taken along the line 37—37 of FIG. 34;

FIG. 38 is an enlarged front side elevational view of the cutting saw blade of the cutting tool of FIG. 32;

FIG. 39 is an end elevational view of the cutting saw blade of FIG. 38;

FIG. 40 is a sectional view taken along the line 40—40 of FIG. 38;

FIG. 41 is a top plan view of the cutting saw blade of FIG. 38;

FIG. 42 is a bottom plan view of the cutting saw blade of FIG. 38; and

FIG. 43 is a back side elevational view of the cutting saw blade of FIG. 38.

DESCRIPTION OF THE PREFERRED EMBODIMENTS

Figure 1:
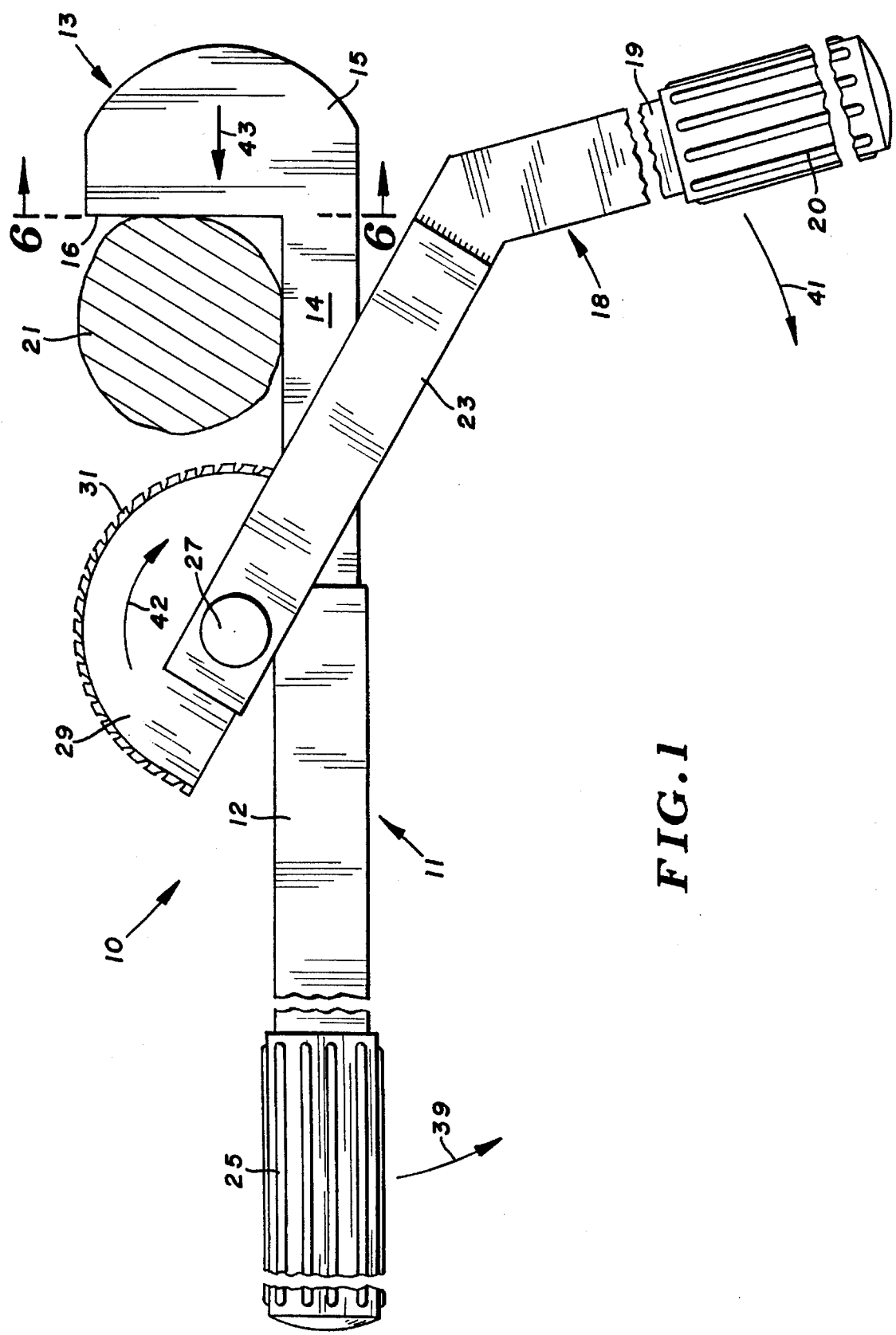
FIG. 1 is a foreshortened side elevational view of the cutting tool of the invention showing the cutting saw blade in the open position.

Referring to FIGS. 1 and 2, there is shown a cutting tool or saw cutter, indicated generally at 10, for cutting objects 21, such as tree branches, wood, logs, twigs, plastic material, metal and the like. Tool 10 has an elongated first body or member 11 having an outwardly directed handle 12. A hand grip 25 is located on the outer end of handle 12. A second member comprising an anvil, indicated generally at 13, is movably mounted on the forward end of body 11. Anvil 13 has an inverted generally U-shaped base 14 that slides and telescopes into passage 44 of handle 12 and an upwardly directed back or jaw 15. Back 15 has an upright, generally flat front face 16. Object 21 bears against front face 16 during the cutting thereof. As seen in FIGS. 5, 6, 7 and 8, base 14 and back 15 have an elongated slot 17 for accommodating a cutting blade 29.

A third body or member, indicated generally at 18, is pivotally mounted on body 11. Body 18 has an elongated handle 19 having an angularly inner portion secured to side members or plates 22 and 23. A hand grip 20 is mounted on the outer end of handle 19. Side plates 22 and 23, as seen in FIG. 3, are located adjacent sleeves or bosses 24 and 26 secured to the top outer end of handle 12. Sleeves 24 and 26, as seen in FIG. 4, have aligned holes that accommodate a pin 27. Pin 27 extends through holes in the outer ends of side plates 22 and 23 to pivotally mount body 18 on body 11. A retainer, such as a cotter pin 28, extends through a hole in the outer end of pin 27 to hold pin 27 in assembled relation with side plates 22 and 23 and sleeves 24 and 26. Sleeves 24 and 26 are laterally spaced from each other to accommodate blade 29.

Figure 7:
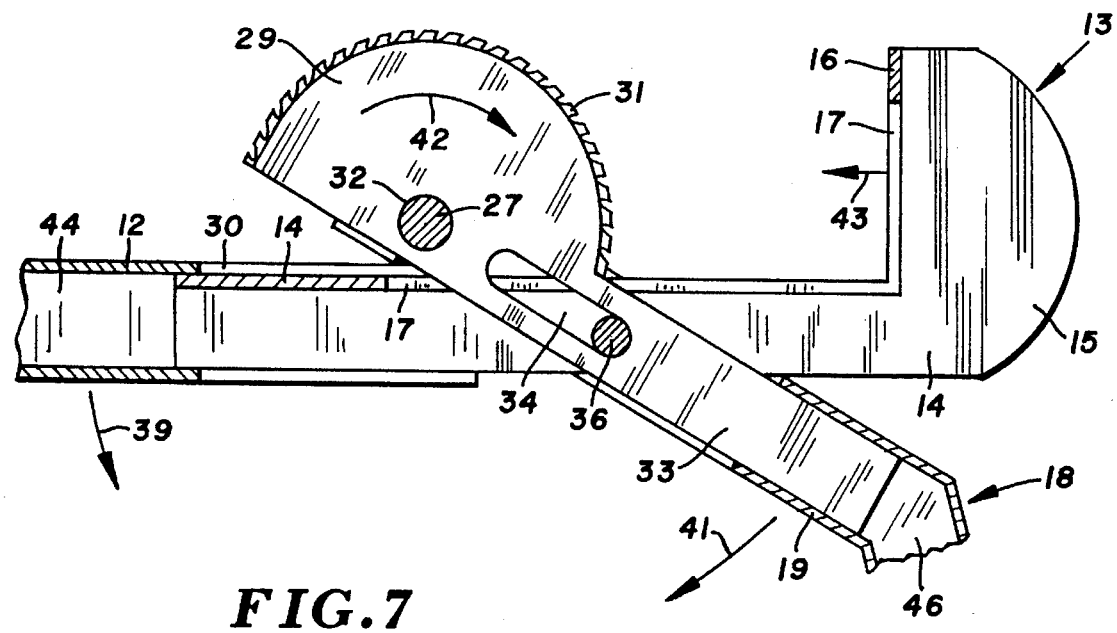
FIG. 7 is an enlarged sectional view taken along the line 7—7 of FIG. 3 showing the cutting saw blade in the open position.
Figure 8:
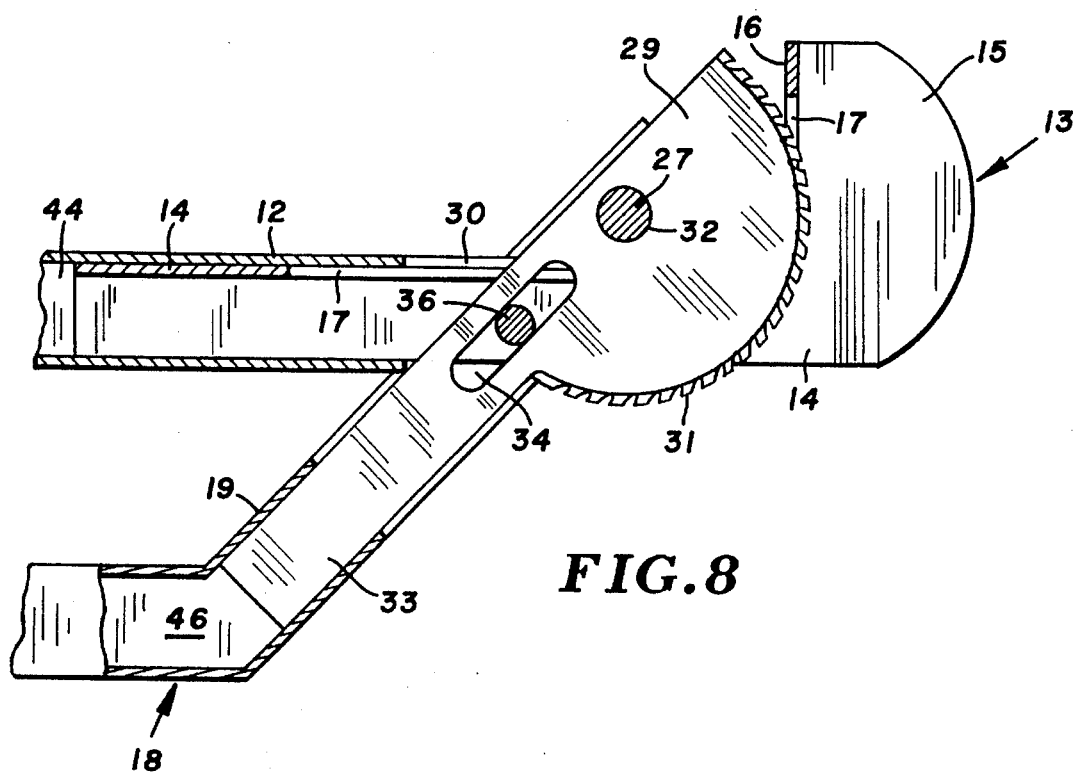
FIG. 8 is a sectional view similar to FIG. 7 showing the cutting saw blade in the closed position.

Blade 29 has a center circular hole 32 to rotatably mount blade 29 on the center of pin 27. Blade 29 is aligned with a longitudinal slot 30 in the outer end of handle 12 and slot 17 in anvil 13. Blade 29 has a arcuate outer serrated edge, having forwardly inclined teeth 31, facing the upright face 16 of anvil 13. Teeth 31 are located along a semi-circular arc having a center axis along the axis of pin 27. An elongated arm 33 is joined to the lower edge of blade 29. Arm 33, as seen in FIGS. 7 and 8, telescopes into passage 46 of tubular handle 19, thereby connecting arm 33 with handle 19. Blade 29 can be removed from tool 10 by removing pin 27 from sleeves 24 and 26 and drawing arm 33 out of passage 46 of handle 19. A new blade with sharp or different shaped teeth can replace blade 29. Blade 29 and arm 33 have an elongated slot 34 that accommodates a transverse pin 36, located generally parallel to pin 27. Pin 36 extends through a hole 37 in base 14 of anvil 13. Blade 29 rotates about pin 27 and pin 36 moves in slot 34 so as to move anvil 13 relative to blade 29.

In use, handles 12 and 19 are moved toward each other, as indicated by arrows 39 and 41. Blade 29, being joined to handle 19, rotates in the direction of arrow 32, turning teeth 31 in a forward or clockwise direction toward the object 21 to be cut.

Concurrently, anvil 13 is moved into passage 44 of handle 12 as pin 36 connects blade 29 with base 14. Blade 29 moves into slot 30 of handle 12. Teeth 31 of blade 29 moves through the upper portion of slot 17 when blade 29 is in the closed position thereby cutting and sawing the entire object located between blade 29 and jaw 15.

When handles 12 and 19 are moved apart, blade 29 will return to its initial position, as shown in FIG. 1. Anvil 13 will move out of handle 12. A second object can then be placed between anvil 13 and blade 29. Movement of handles 12 and 19 toward each other will to cut the object.

Figure 9:
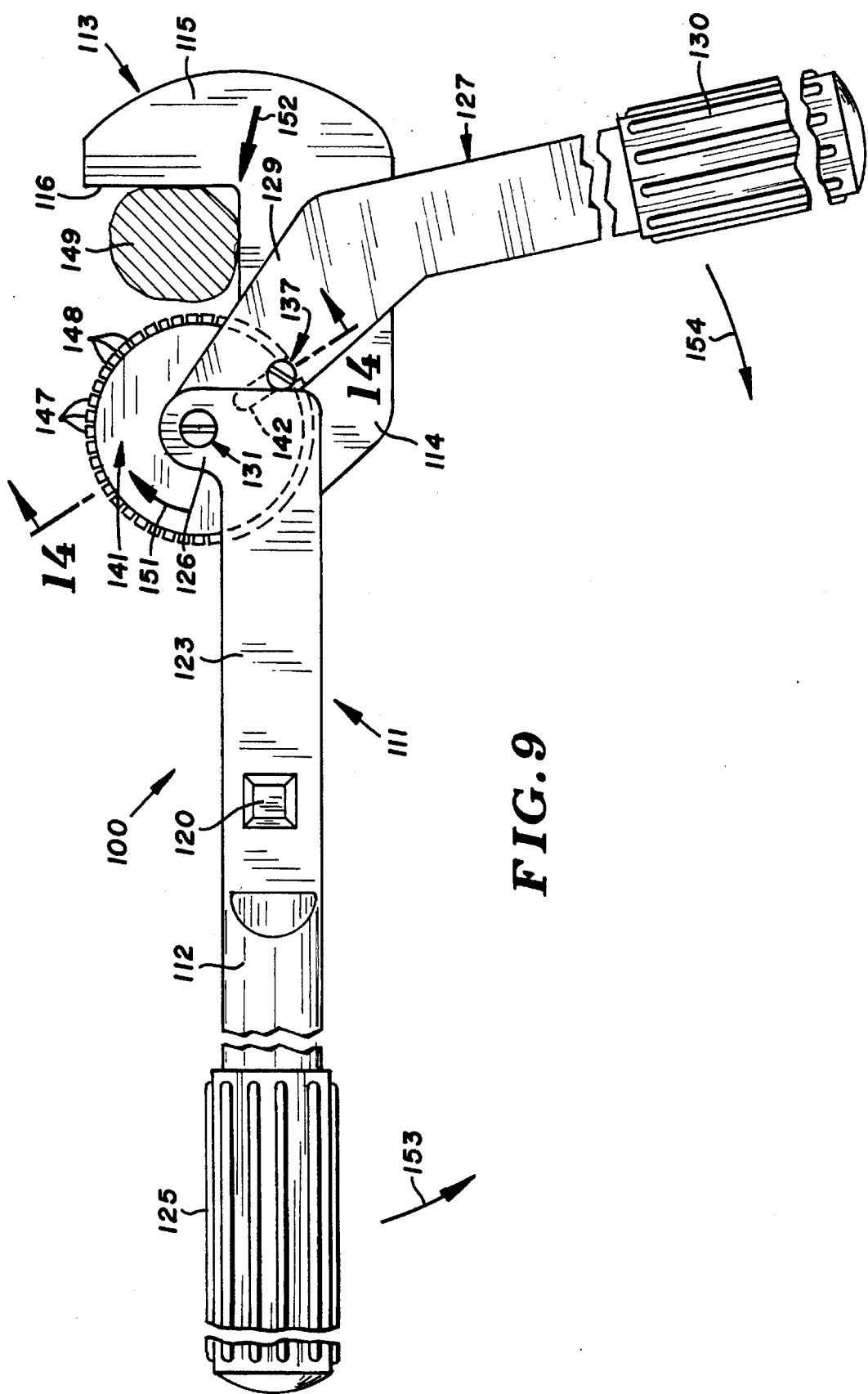
FIG. 9 is a foreshortened side elevational view of a first modification of the cutting tool of the invention showing the cutting saw blade in the open position.
Figure 10:
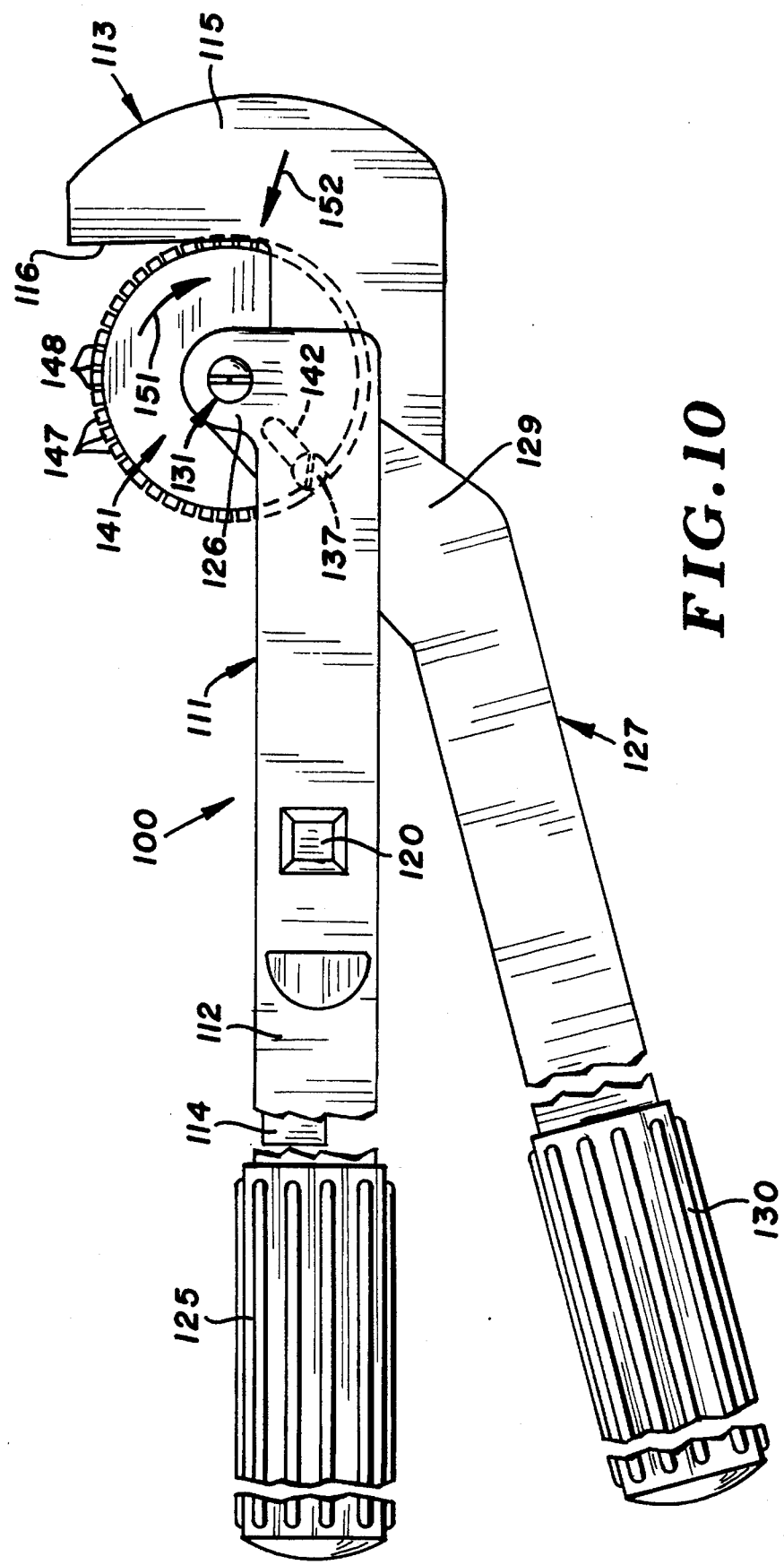
FIG. 10 is a foreshortened side elevational view of the cutting tool of FIG. 9 showing the cutting saw blade in the closed position.
Figure 15:
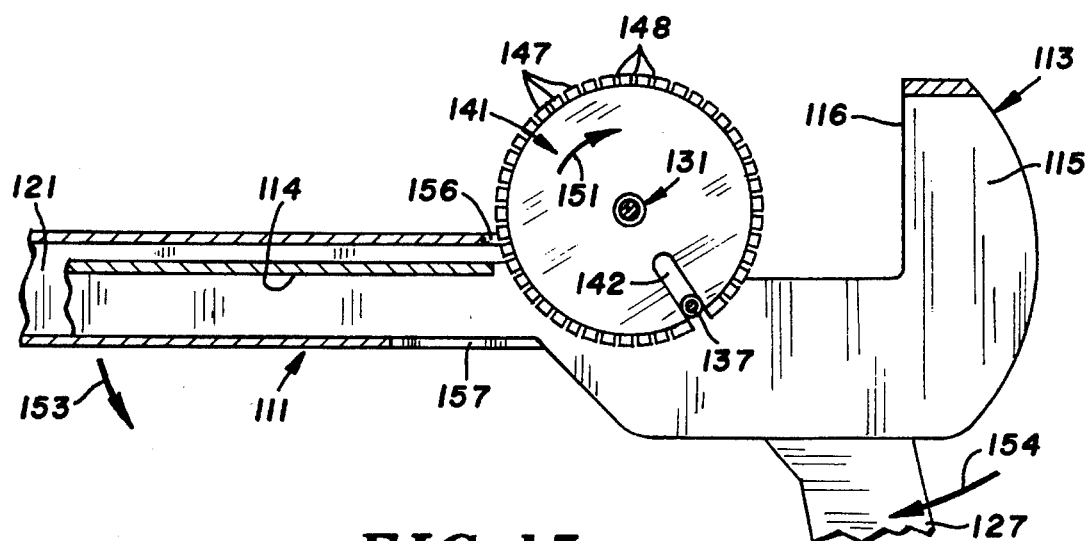
FIG. 15 is a sectional view taken along the line 15—15 of FIG. 11 showing the cutting saw blade in the open position.
Figure 16:
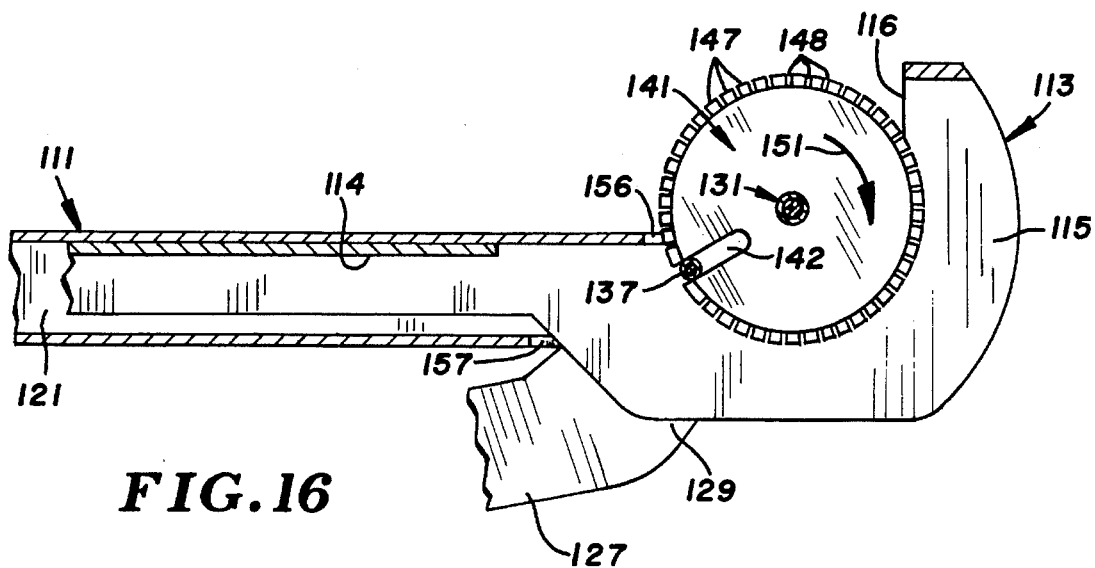
FIG. 16 is a sectional view similar to FIG. 15 showing the cutting saw blade in the closed position.
Figure 20:
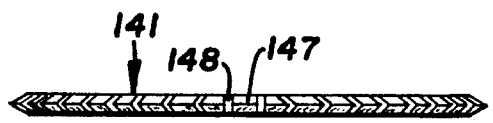
FIG. 20 is a top plan view of the cutting saw blade of FIG. 18.
Figures 17, 18, 19:
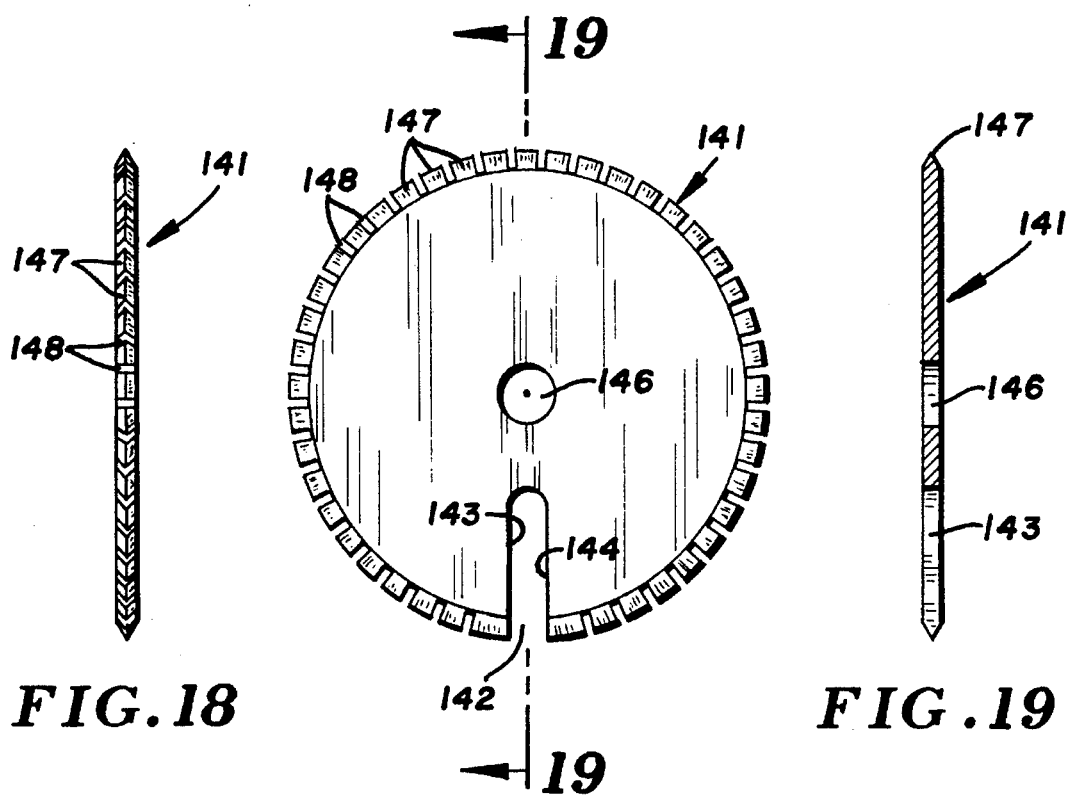
FIG. 17 is an enlarged side elevational view of the cutting saw blade in the cutting tool of FIG. 9.
FIG. 18 is a side edge elevational view of the cutting saw blade.
FIG. 19 is a sectional view taken along the line 19—19 of FIG. 18.
Figure 21:
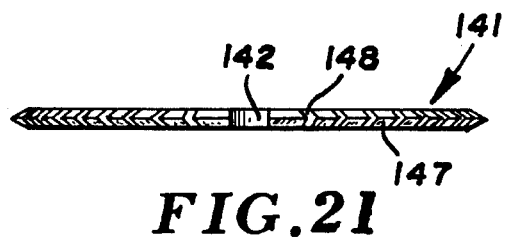
FIG. 21 is a bottom plan view of the cutting saw blade of FIG. 18.
Figure 25:
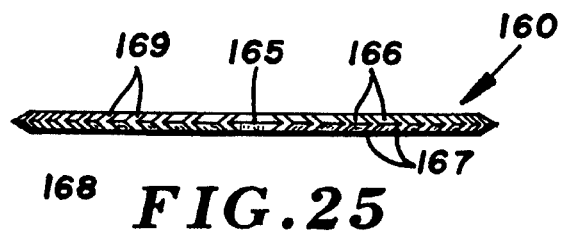
FIG. 25 is a top plan view of the cutting saw blade of FIG. 22.
Figures 22, 23, 24:
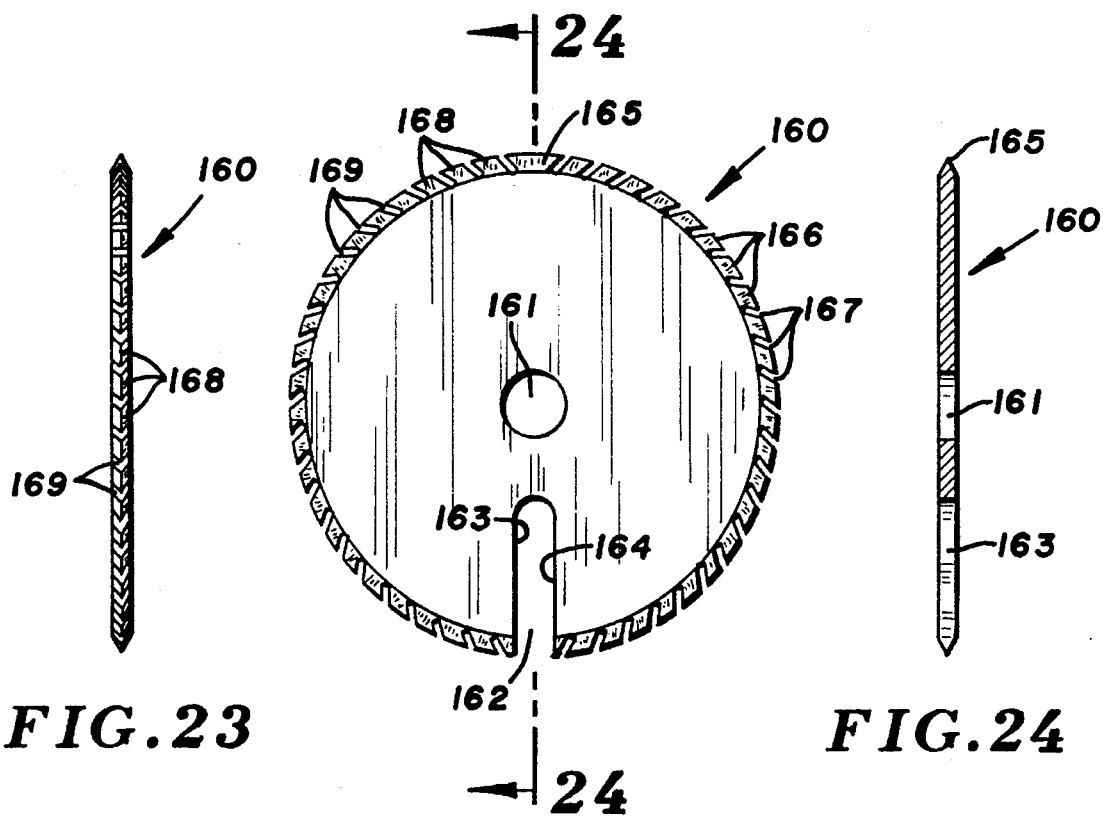
FIG. 22 is an enlarged side elevational view of a first modification of a cutting saw blade for the cutting tool of FIG. 9.
FIG. 23 is an side edge elevational view of the cutting saw blade of FIG. 22.
FIG. 24 is a sectional view taken along the line 24—24 of FIG. 22.
Figure 26:
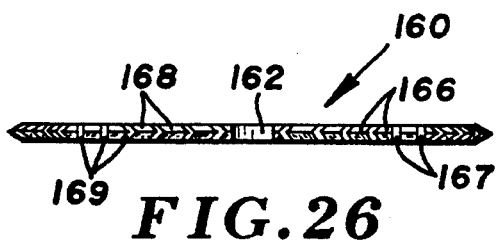
FIG. 26 is a bottom plan view of the cutting saw blade of the cutting saw blade of FIG. 22.

Referring to FIGS. 9, 10 and 11, there is shown a first modification of the cutting tool or saw cutter of the invention indicated generally at 100 for cutting objects such as tree branches, wood, logs, twigs, plastic, metal and the like. Tool 100 has a first elongated body or member 111 having an outwardly directed linear handle 112. A cylindrical hand grip 125 is telescoped over the outer end of handle 112 to provide a convenient grip for the hand of the user. The outer end of handle 112 is cylindrical. The inner end has generally flat side members 122 and 123 join to upwardly directed ears 124 and 126 at the inner upper ends thereof.

A second member or anvil, indicated generally at 113, has an elongated base 114 that telescopes into passage 121 of handle 112. An upwardly directed back 115 is joined to base 114. Back 115 has a pair of upwardly directed front faces 116. Base 114 is a generally U-shaped member having a top longitudinal slot 117, as seen in FIG. 11. Slot 117 extends upwardly into back 115 and is open to faces 116. As seen in FIG. 12, handle 112 has a pair of inwardly directed bosses 119 and 120 having inside surfaces that act as guides or bearing surfaces for opposite sides of base 114 to allow base 114 to longitudinally move in passage 121. Other structures can be used as guides for base 114.

A third member, indicated generally at 127, comprises an elongated handle having inner end members or arms 128 and 129 and a hand grip 130 at the outer end thereof. A pivot pin, indicated generally at 131, pivotally connects arms 128 and 129 to ears 124 and 126. Pin 131, as shown in FIG. 14, comprises a nut 132 accommodating a bolt 133. Nut 132 has a cylindrical body extended through the aligned holes of ears 124 and 126, members 128 and 129, washers 134 and 136 and saw cutter blade 141. Other types of pivot pins can be used to pivotally connect third member 127 with first member 111.

A drive pin 137, as seen in FIG. 14, connects base 114 to third member 127 whereby second member 113 moves in response to pivotal movement of third member 127. Drive pin 137 extends through aligned holes 138 and 139 in base 114 and through a generally radial slot 142 in cutter disc or circular saw blade 141 so that upon pivotal movement of handles 111 and 127 toward each other, cutter disc 141 will rotate in a clockwise direction, as seen in FIG. 9 and indicated by arrow 151. Anvil 113, supporting object 149, will move toward rotating cutter disc 141 indicated by arrow 152 thereby cutting object 149 located between cutter disc 141 and front face 116 of anvil 13. Base 114 moves into passage 121 and engages the upper inside surface of handle 112, moving anvil 13 in an upward direction as it moves toward cutter disc 141. This moves object 149 in a general counter-clockwise direction into engagement with the clockwise moving teeth 147 of cutter disc 141. Teeth 147 of cutter disc 141 move into slot 117 in back 115 so the object is completely cut.

When the cut is completed, handles 111 and 127 are moved apart to return cutter disc 141 to its original open position, as seen in FIG. 9. Cutter disc 141 is rotated in a counterclockwise direction. Anvil 113 moves outwardly away from cutter disc 141 thereby providing a space for the next object to be cut. A second object can then be placed between anvil 113 and cutter disc 141. Movement of handles 111 and 127 toward each other will rotate cutter disc 141 and move anvil 113 toward cutter disc 141 thereby cutting the second object.

Cutter disc 141 can be turned 180° so that the teeth on the left portion of cutter disc 141, as seen in FIG. 9, are used to cut the object. Pin 131 is removed to allow cutter disc 141 to be pulled from tool 100, as slot 142 is open to the outer edge of the cutter disc 141. Cutter disc 141 is turned 180° and inserted back into tool 100 with radial slot 142 accommodating drive pin 137. Disc 141 can have additional radial slots adapted to accommodate drive pin 137. Pin 131 is then inserted through the aligned holes to rotatably mount cutter disc 141 on pin 131.

As seen in FIGS. 17–21, cutter disc 141 is a generally flat circular saw cutter blade having a central hole 146 adapted to accommodate pivot pin 131. Cutter disc 141 rotates on pin 131. In use, slot 142 in disc 141 is formed by generally parallel walls 143 and 144 that extend toward the center of disc 141. Slot 142 has a width to accommodate drive pin 137. The outer peripheral edge of cutter disc 141 is circular and accommodates a plurality of teeth 147. Teeth 147 are separated from each other with radial cuts or slots 148. Each tooth has a generally square side or profile and converges outwardly, as seen in FIGS. 18–21. Cutter disc 141 is made of high strength steel or other suitable cutting materials. Cutter disc 141 can be turned 180° so that the teeth 147 on opposite sectors of disc 141 can be used to cut the object.

Referring to FIGS. 22–26, there is shown a modification of the saw cutter disc or blade, indicated generally at 160 useable with cutting tool 100 in lieu of saw cutter blade 141. Saw cutter disc 160 is a generally flat circular saw cutter blade having a central hole 161 that is adapted to accommodate pivot pin 131. An outwardly directed radial slot 162 in disc 160 is formed by generally parallel walls 163 and 164. Slot 162 extends from the outer periphery of disc 160 the disc 160 toward center hole 161 providing an elongated slot for the drive pin 137. The width of slot 172 is substantially the same as the diameter of drive pin 137. Directly opposite slot 162 is a transition tooth 165 separating the first teeth 166 from the second teeth 168. Teeth 166 and 168 have generally opposite parallel profiles and are separated from each other with slots 167 and 169, respectively. Slots 167 are inclined in a clockwise direction. Each slot 167 is inclined at an angle of about 45° with respect to a diameter line slots 169 are inclined in a counter-clockwise direction. The angle of inclination of each slot 169 is about 45° with respect to a diameter line. Cutter disc 160 is useable in two positions whereby teeth 166 and 168 alternatively cut the object. Disc 160 is turned 180° so that teeth 168 cut the object in lieu of teeth 166. This extends the useful life of the cutter disc. Teeth 166 and 168 can have different shapes so the user has a choice of cutting teeth useable with cutting tool 100. Cutter disc 160 is made of high-strength steel or other suitable cutting materials.

Figure 30:
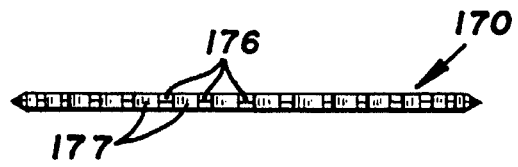
FIG. 30 is a top plan view of the cutting saw blade of FIG. 27.
Figures 27, 28, 29:
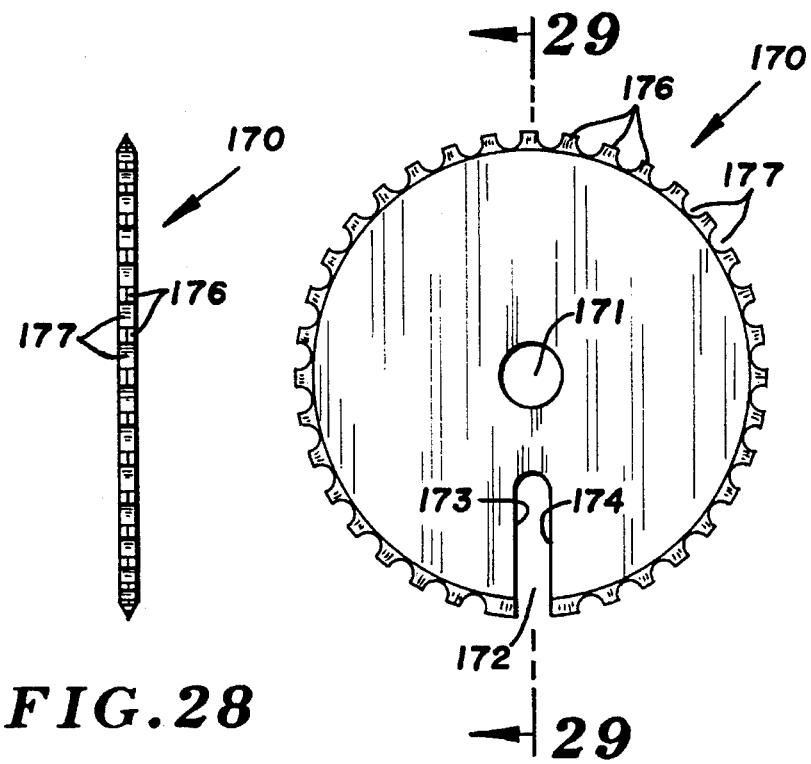
FIG. 27 is an enlarged side view of a second modification of a cutting saw blade for the cutting tool of FIG. 9.
FIG. 28 is a side elevational view of the cutting saw blade of FIG. 27.
FIG. 29 is a sectional view taken along the line 29—29 of FIG. 27.
Figure 31:
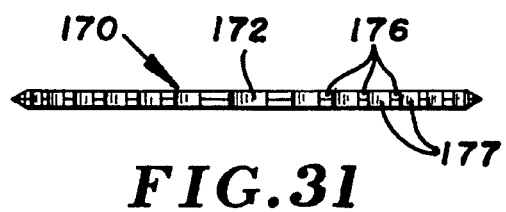
FIG. 31 is a bottom plan view of the cutting saw blade of FIG. 27.

Referring to FIGS. 29–31, there is shown a second modification of the saw cutter disc or blade for tool 100, indicated generally at 170. Cutter disc 170 can be used in lieu of saw cutter blade 141. Saw cutter disc 170 is a generally flat circular saw blade having a central hole 171 adapted to accommodate pivot pin 131. An outwardly directed radial slot 172 in disc 160 is formed by generally parallel side walls or edges 173 and 174. Slot 172 extends from the outer periphery of disc 170 into the disc toward center hole 171. Slot 172 provides a radial passageway for drive pin 137. The width of slot 172 is substantially the same as the diameter of drive pin 137, so that on movement of drive pin 137, disc 170 will rotate. The outer periphery of disc 170 has a circular array of teeth 176. Adjacent teeth are separated with U-shaped grooves or slots 177, as seen in FIG. 27. Teeth 176 have side surfaces that taper outwardly and inwardly to a central edge. Slots 177 are generally U-shaped so that the opposite ends of each tooth taper inwardly toward each other. Cutter disc 170 is useable in two positions whereby the teeth 176 on the right and left sectors of the disc are used to alternatively cut the object. Disc 170 is turned 180° so that the teeth on the left side of the disc can be used to cut the object in lieu of the teeth on the right side of the disc. This extends the useful life of the cutter disc.

Figure 32:
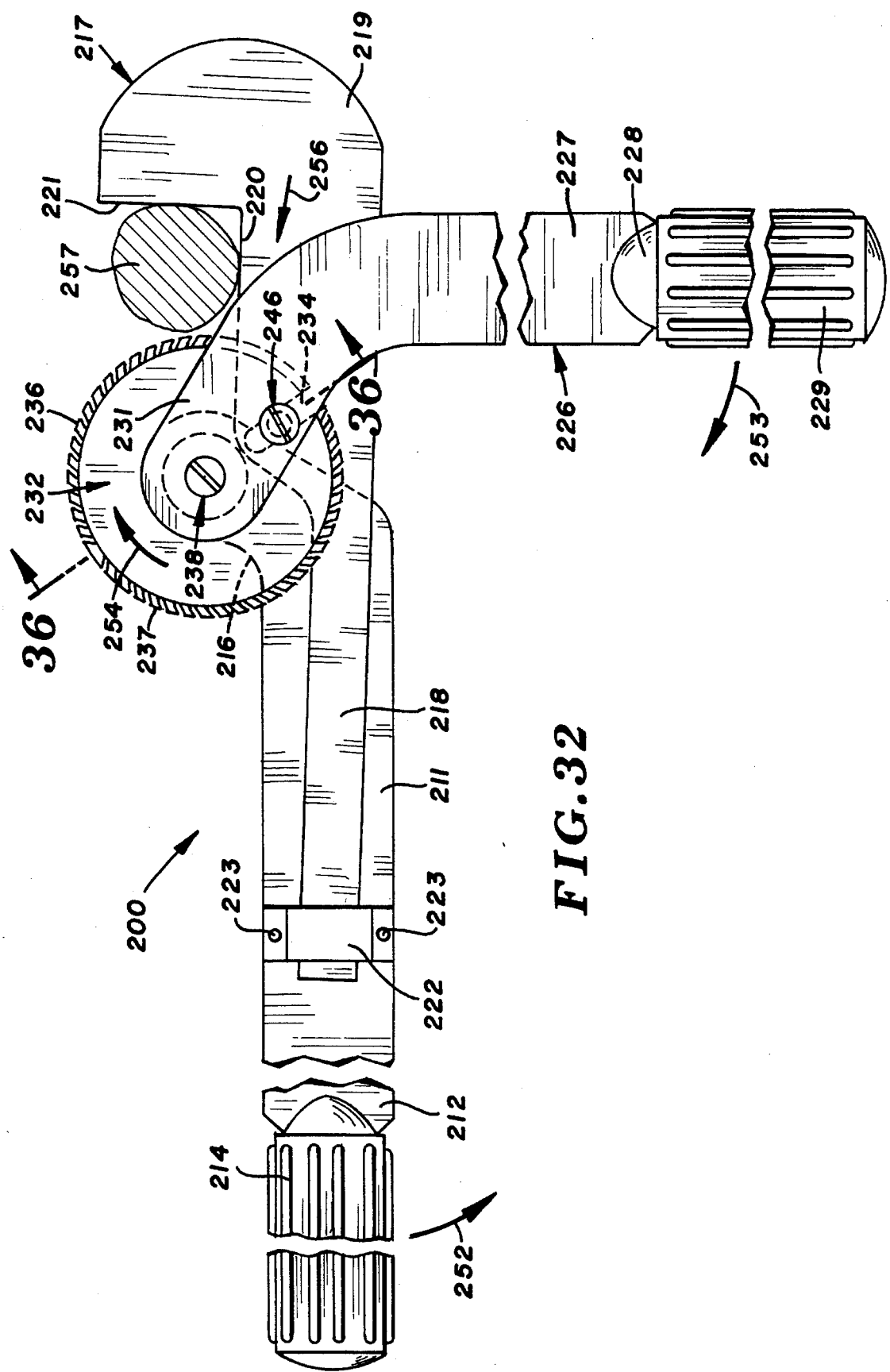
FIG. 32 is a foreshortened side elevational view of a second modification of the cutting tool of the invention showing the cutting saw blade in the open position.
Figure 33:
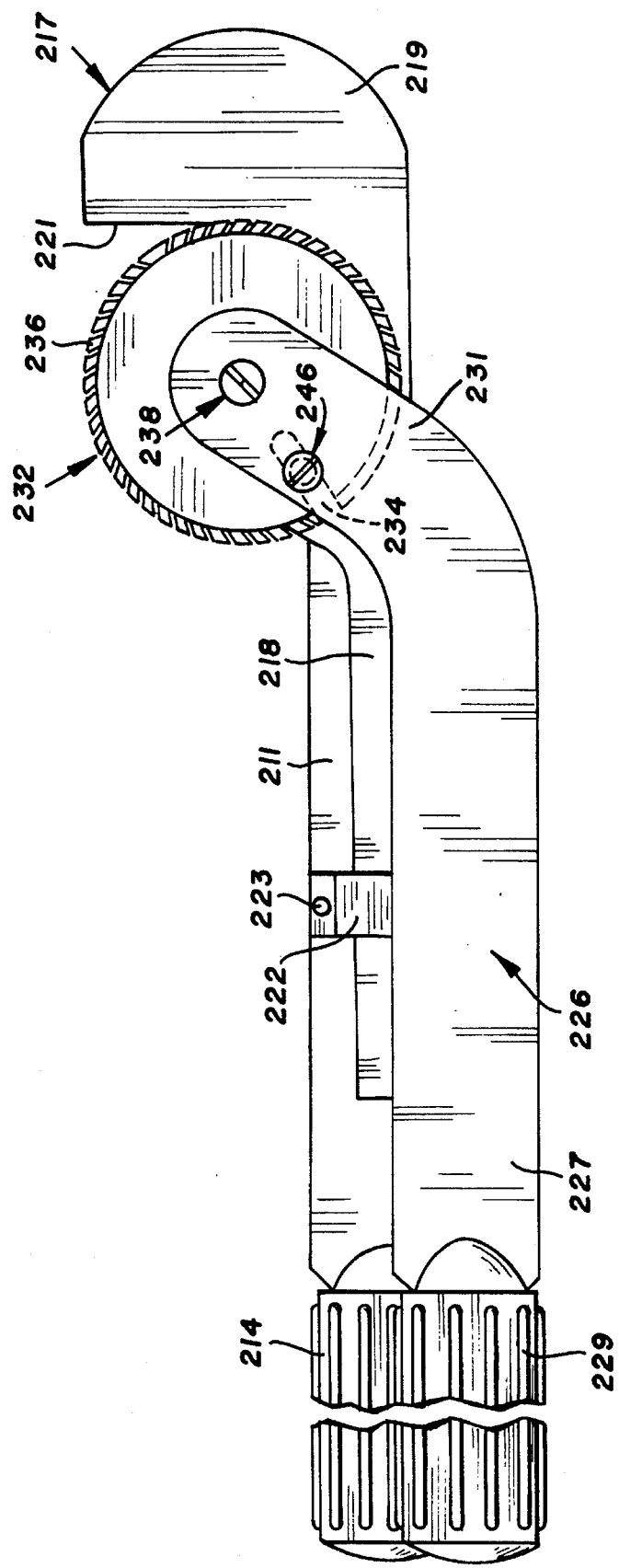
FIG. 33 is a foreshortened side elevational view of the cutting tool of FIG. 32 showing the cutting saw blade in the closed position.

Referring to FIGS. 32, 33 and 34, there is shown a second modification of the cutting tool or saw cutter of the invention, indicated generally at 200, for cutting objects such as tree branches, wood, logs, twigs, plastic, metal and the like. Tool 200 has a first elongated body or member 211 having an outwardly directed linear handle 212. The outer end of handle 212 has an outwardly offset end 213 supporting a generally cylindrical hand grip 214. The inner end of body 211 has an upwardly directed ear 216. Body 211 is a generally flat bar with an offset end 213.

A second member or anvil, indicated generally at 217, is located adjacent one side of first member 211. Member 217 has an elongated flat base 218 and an upwardly directed back 219. The back 219 has an upwardly directed face 221. Base 218 is retained in sliding surface engagement with the inside surface of first member 211 with a bracket 222 joined to base 218 with a plurality of fasteners 223. Other types of fasteners such as welds and the like can be used to secure bracket 222 to base 218. Bracket 222 forms with base 218 a passage 224, as seen in FIG. 35, for slideably accommodating in the end of base 218.

A third member, indicated generally at 226, is located adjacent the outside of second member 217. Third member 226 has an elongated handle 227 with an offset end 228 accommodating a generally cylindrical hand grip 229. The inner or opposite end has an arm 231 of handle 227 that curves upwardly and has a hole to accommodate a pivot member, indicated generally at 238. Arm 231 is located adjacent a circular saw blade or cutter disc, indicated generally at 232 having a radial slot 234 and outer circular peripheral edge—accommodating teeth 236 and 237. Teeth 236 and 237 have a generally triangular cross section with a generally radial flat side and an upwardly and inwardly directed outside surface, as seen in FIG. 36.

Pivot member 238 comprises a bolt 239 threaded into a tubular nut 241. Nut 241 has a cylindrical body that projects through holes 242, 243 and 244 in spacer washers 240, saw cutter disc 232 and arm 231. Saw cutter blade 232 is rotatably mounted on pivot pin 238. Pin 238 also accommodates washer 240 interposed between member 216 and cutter disc 232, as seen in FIG. 36.

A drive pin, indicated generally at 246, is connected to base 218 of anvil 217 and end 231 of lever 227. Drive pin 246 extends through slot 234 in cutter blade 232. Blade 232 can have additional slots adapted to accommodate drive pin 246. Drive pin 246 comprises a bolt 247 and a tubular nut 248. Nut 248 extends through hole 251 in base 218 and has a cylindrical body that has internal threads accommodating bolt 247. The cylindrical body of bolt 248 extends through hole 249 in member 231. Slot 234 has a width substantially the same as the diameter of body of bolt 248, so that on rotation of handle 227, drive pin 246 will rotate cutter disc 232 in the direction of arrow 254, as seen in FIG. 32, when handles 211 and 227 are moved toward each other, as indicated by arrows 252 and 253.

In use, as shown in FIG. 32, work 257, such as a wood, plastic or metal object is placed on the floor 220 of anvil 217 adjacent upright edge 221. Handles 212 and 227 are moved toward each other, as indicated by arrows 252 and 253. Drive pin 246 will rotate cutter disc 232 in a clockwise direction, as indicated by arrow 254. Concurrently, anvil 217 will move toward cutter disc 232, as indicated by arrow 252, thereby moving object 257 into the rotating cutter teeth 236. The upwardly directed face 221 of anvil 217 has an upwardly directed outside linear edge 258, as seen in FIG. 36, that is in substantially the same plane as the flat inside surface of cutter disc 232. Cutter disc 232 has outside knife edges 236A cooperating with edge 258 to provide a clean cut through the entire object 257. Anvil 217 and cutter disc 232 have a relatively flat configuration so that the cutting tool can be used to trim branches and bushes close to a trunk or the ground.

When the cut through object 257 is completed, handles 211 and 227 are moved apart to return cutter disc 232 to its original open position, as seen in FIGS. 32 and 37. Cutter disc 232 is located in a counter-clockwise direction, as handles 211 and 227 are moved apart. Anvils 217 moves outwardly away from cutter disc 232 thereby providing a space for the next object to the cut. The second object is then placed between anvil 217 and cutter disc 232. Movement of handles 211 and 227 toward each other, as indicated by arrows 252 and 253, will rotate cutter disc 232 in a clockwise directed, as indicated by arrow 254 and move anvil 257 toward cutter disc 232, as indicated by arrow 256, thereby cutting the second object.

Referring to FIGS. 38–43, there is shown a modification of the cutter disc, indicated generally at 260, that is useable with cutter tool 200 in lieu of cutter disc 232. Cutter disc 260 has a central hole 261 to accommodate pivot pin 238 and a generally radial slot 262 to accommodate drive pin 246. Slot 262 is formed by generally radial parallel side walls 263 and 264 which extend from the outer periphery of the disc toward the central hole 261. A second slot opposite slot 262 can be included in disc 260 to allow the disc to be turned 180° so that the rear section of the disc can be used to cut the object. The outer peripheral edge of disc 260 has a plurality of teeth 266 that are separated from each other with slots or grooves 267. Slots 267 are generally U-shaped and extend from a flat side 268 of disc 260 to a tapered or feathered edge 269 providing each tooth with a knife edge 271.

While there has been shown and described preferred embodiments of the cutting tools and saw cutter blades of the invention, it is understood that changes in the structure, materials and arrangement of structure and parts may be made by those skilled in the art without departing from the invention. The invention is defined in the following claims.

I claim:

1. A tool for cutting an object comprising:

a first member, a second member movably mounted on the first member, said second member having means engageable with the object to be cut, a third member movably mounted relative to the first member, pivot means pivotally connecting the third member to the first member, blade means having generally circular cutting means facing said second member means pivotally mounted on the pivot means, drive means connecting the second member and third member, said blade means having a generally radial slot accommodating the drive means wherein when the first and third members are moved toward each other, said drive means rotates the blade means toward said second member means and the drive means moves the second member means toward said cutting means so as to cut an object located between said cutting means and the second member means.

2. The tool of claim 1 wherein:

the first member has an elongated handle having an outer end with a passage, said second member has a base telescoped into the passage at the outer end of the handle wherein the second member is movably mounted relative to the first member.

3. The tool of claim 2 including:

guide means located with the passage of the handle engageable with the base for guiding the base as it moves relative to the handle.

4. The tool of claim 1 wherein:

the blade means comprises a generally flat cutter disc having a central hole accommodating the pivot means wherein the cutter disc is rotatably mounted on the pivot means, said cutter disc having a generally circular outer edge accommodating the circular cutting means, said slot extending from said outer edge toward the central hole.

5. The tool of claim 4 wherein:

the cutting means comprises outwardly directed teeth for cutting the object during rotation of the cutter disc.

6. The tool of claim 5 wherein:

adjacent teeth are separated from each other with generally radial slots.

7. The tool of claim 5 wherein:

adjacent teeth are separated from each other with slots inclined in the direction of rotation of the cutter disc.

8. The tool of claim 1 wherein:

the drive means includes a drive pin extended generally parallel to the pivot means, said drive pin extended through said slot in the blade means.

9. The tool of claim 1 wherein:

the first member includes an elongated handle having laterally spaced side members and a longitudinal passage, said second member having a base extended into said passage and an upwardly directed back, said base having a longitudinal slot, said blade means having a portion thereof extended through said slot, said third member having laterally spaced arms located between the side members of the first member and the blade means, said pivot means comprising a transverse pivot pin pivotally connecting said side members to said arms, said blade means being rotatably mounted on said pivot pin between said arms.

10. The tool of claim 9 wherein:

the drive means includes a drive pin extended generally parallel to the pivot pin and through said slot in the blade means, said drive pin being connected to said base and arms wherein pivotal movement of the first and third members relative to each other moves the second member relative to the first member.

11. The tool of claim 9 wherein:

the blade means comprises a generally flat cutter disc having a central hole accommodating the pivot pin wherein the cutter disc is rotatably mounted on the pivot pin, said cutter disc having a generally circular outer edge, said cutting means comprising teeth on the outer edge, said radial slot in the cutter disc extending from the outer edge toward the central hole.

12. The tool of claim 11 wherein:

adjacent teeth are separated with slots.

13. The tool of claim 1 wherein:

the first member has a handle with a side member, said second member having a base located adjacent the side member and an upwardly directed back, means retaining the base on the side member and allowing general longitudinal movement of the base relative to the side member, said blade means being located adjacent said base, said third member having an arm located adjacent said blade means, said pivot means comprising a transverse pivot pin being rotatably mounted on said pin between said side member and arm.

14. The tool of claim 13 wherein:

the drive means includes a drive pin extended generally parallel to the pivot pin and through said slot in the blade means, said drive pin being connected to said base and arm wherein pivotal movement of the first and third members relative to each other moves the second member relative to the first member.

15. The tool of claim 13 wherein:

the blade means comprises a generally flat cutter disc having a central hole accommodating the pivot pin wherein the cutter disc is rotatably mounted on the pivot pin, said cutter disc having a generally circular outer edge, said cutting means comprising teeth on the outer edge, said radial slot in the cutter disc extending from the outer edge toward the central hole.

16. The tool of claim 15 wherein:

adjacent teeth are separated with slots.

17. A tool for cutting an object comprising:

an elongated first member having a passage open to one end thereof and a pair of laterally spaced side members, a second member comprising an anvil having an elongated linear base slideably extended into said passage and a jaw joined to the base and extended upwardly therefrom, a third member having laterally spaced arms movably mounted relative to the first member, pivot means connecting the arms of the third member to said laterally spaced side members of the first member, blade means having an outer peripheral, generally circular edge and outer peripheral, generally circular edge thereof facing said jaw, said blade means being rotatably mounted on the pivot means whereby the blade means can be selectively rotated toward or away from the jaw, drive pin means connecting the arms to the base of the anvil, said blade means having a slot accommodating said pin means wherein on movement of the first and third members toward each other, the blade means rotates toward the jaw and the jaw moves toward the blade means so as to cut an object located between said blade means and jaw.

18. The tool of claim 17 wherein:

the base and jaw have aligned slots accommodating the blade means during movement of the blade means and anvil.

19. The tool of claim 17 wherein:

the blade means comprises a generally flat cutter disc having a central hole accommodating the pivot means wherein the cutter disc is rotatably mounted on the pivot means, said cutter disc having a generally circular outer edge accommodating the circular cutting means, said slot extending from said outer edge toward the central hole.

20. The tool of claim 19 wherein:

cutting means comprises outwardly directed teeth for cutting the object during rotation of the cutter disc.

21. The tool of claim 20 wherein:

adjacent teeth are separated from each other with slots.

22. The tool of claim 17 wherein:

the drive means includes a drive pin extended generally parallel to the pivot pin and through said slot in the blade means, said drive pin being connected to said base and arms wherein pivotal movement of the first and third members relative to each other moves the second member relative to the first member.

23. A tool for cutting an object comprising:

a first means having a first handle and a jaw engageable with an object to be cut, a second means having a second handle, pivot means pivotally connecting the first means to the second means, blade means having a generally arcuate cutting means facing said jaw, means pivotally connecting the blade means to the second means, and drive means connected to the first means, said blade means having a slot accommodating the drive means wherein when the first and second handles are moved toward each other, said drive means rotates the blade means about the means pivotally connecting the blade means to the second means as the blade means moves toward the jaw so as to cut an object located between the blade means and the jaw.

24. The tool of claim 23 wherein:

the blade means has a generally semi-circular shape having an outer peripheral edge, said edge having said cutting means, said cutting means having a plurality of cutting teeth.

25. The tool of claim 23 wherein:

the blade means comprises a generally flat cutter disc having an outer peripheral edge and a central hole accommodating the means pivotally connecting the blade means to the second means whereby the cutter disc is rotatably mounted on the means pivotally connecting the blade means to the second means, said slot extending from the outer peripheral edge toward the means pivotally connecting the blade means to the second means.

26. The tool of claim 23 wherein:

the drive means includes a drive pin extended generally parallel to the pivot means, said drive pin extended through said slot in the blade means.

27. The tool of claim 23 wherein:

the cutting means includes outwardly-directed teeth for cutting the object during rotation of the blade means.

* * * * *